Patented July 23, 1940

2,209,131

UNITED STATES PATENT OFFICE 2,209,131

PROCESS FOR THE PREPARATION OF BERYLLIUM COMPOUNDS

Remo Szyia Opatowski, Milan, Italy, assignor of eighty per cent to Gesellschaft zur Verwertung chemisch-technischer Verfahren A. G., Vaduz, Liechtenstein, a company of Liechtenstein No Drawing. Application October 12, 1938, Serial No. 234,696. In Italy October 13, 1937

12 Claims. (Cl. 23—24)

Among the most interesting industrial processes for the preparation of beryllium compounds from the beryllium earths in the first place the processes should be mentioned in which the decomposition of the beryl ($3BeO.Al_2O_3.SiO_2$) is effected either by means of sodium fluosilicate (cfr. French Patent Specification 476465—Copaux) or by means of alkali carbonates or hydroxides (cfr. German Pat. Specns. 557228—Siemens and No. 635047 (Degussa).

The above mentioned process according to Copaux presents still a number of technical and economical drawbacks, among which the following ones may be mentioned:

(1) High fluosilicate consumption which is employed in a great excess (more than twice) with regards to the quantity of fluosilicate which is theoretically sufficient in order to convert the beryllium of the ore into sodium fluoberyllate.

(2) Decomposition of the said excess of sodium fluosilicate according to the equation:

$$Na_2SiF_6 = 2NaF + SiF_4$$

Therefore large quantities of gaseous caustic and poisonous silicon tetrafluoride are produced, which must be recovered by means of special costly plants.

(3) Easy melting of the mixture by the temperature of reaction with consequent heavy attack of the furnace lining.

(4) Fluorine losses, as a part of the fluosilicate combines itself with the alumina contained in the ore by forming insoluble double fluorides of alumina and sodium, which cannot be separated from the silicious residues.

According to other processes, that are based upon the above mentioned process, it has been attempted to overcome some of the said inconveniences and particularly the formation of $SiF_4$ by substituting for a part of the sodium fluosilicate other costly fluorine compounds as e. g. sodium fluoride (cfr. Germ. Pat. Specn. 577629—Beryllium Corp.). However also this process presents a great drawback due to the fact that the relatively slightly soluble (4%) sodium fluoride must be recovered from diluted solutions by evaporation (cfr. cited specn. page 2, lines 61–63 and 103–110 and cl. 3). This entails a large fuel consumption and the necessity of providing voluminous evaporating plants. It has been calculated that for each kilogram of beryllium extracted from the ore in the form of sodium fluoberyllate, 19 kgs. of sodium fluoride must be recovered from the mother liquors containing about 3.5% NaF and therefore a bulk of more than 500 liters of water must be evaporated.

Other processes by which the beryllium is extracted from its ores by means of alkaline reagents ($Na_2CO_3$ or highly concentrated caustic soda) present the inconvenience that by the decomposition of the ore a large quantity of silica is formed. Still other processes present the inconvenience of necessitating a high alkali consumption (20–30 kgs. of caustic soda resp. of sodium carbonate for each kg. of BeO) as the alkali combines itself not only with the beryllium oxide, but also with the silica and alumina of the earth.

By the process according to the invention all above mentioned inconveniences are overcome by effecting the decomposition of the earth by means of an alkaline fluosilicate but without any objectionable excess of fluorine.

In case the decomposition of the beryl be effected by means of sodium fluosilicate, for a beryl having the theoretical composition (13.9% of BeO), 0.7 part of fluosilicate would be necessary for each part of beryl, viz. less than one-half of the amount employed by Copaux (cfr. cited French Patent 476465) which is of 1.5 parts of sodium fluosilicate for each part of beryl. In practice, as the commercial material contains from 10 to 11% of BeO, 0.5 to 0.55 parts of sodium fluosilicate should be employed for each part of beryl.

In this manner, as the disintegration of the earth is effected by employing an amount of fluosilicate that does not exceed the amount that is necessary for the combination of the beryllia only, all technical and economical drawbacks inherent to the process according to Copaux are overcome while, on the other hand, for effecting the decomposition of the ore, it is not necessary to add either sodium fluoride (as employed e. g. according to the cited German Patent 557629), or some other fluorine salt.

Furthermore, the process according to the invention differs from other processes in that the recuperation of the fluorine reagents, that are the most costly, is accomplished without having recourse to evaporation. This means a remarkable fuel economy and avoids the necessity of providing large evaporating plants. In fact, according to the invention, the fluorine is recovered without appreciable losses directly in the form of sodium fluosilicate adapted to be reemployed in the cycle as will be seen hereinafter.

According to the invention, the decomposition of the beryl is effected by calcining the finely powdered material previously intimately mixed with a quantity of sodium fluosilicate calculated upon the BeO contents of the earths and with a small quantity of alkali carbonate or hydroxide. By employing $Na_2CO_3$, 0.2 part is necessary for each part of beryl while by employing NaOH, 0.15 part NaOH for each part of beryl is sufficient. The proportions must be such as to promote one of the following reactions:

$$Na_2CO_3 + 2Na_2SiF_6 + 3BeO.Al_2O_3.6SiO_2 =$$
$$3Na_2BeF_4 + 8SiO_2 + Al_2O_3 + CO_2 \quad (I)$$

or also:

$$2NaOH + 2Na_2SiF_6 + 3BeO.Al_2O_3.6SiO_2 =$$
$$3Na_2BeF_4 + 8SiO_2 + Al_2O_3 + H_2O \quad (II)$$

Equations I and II may be summarized in the manner known in the art as follows:

$$M_2O + 2M_2SiF_6 + 3BeO.Al_2O_3.6SiO_2 =$$
$$3M_2BeF_4 + 8SiO_2 + Al_2O_3 \quad (III)$$

wherein "M" designates alkali metal.

From the sodium fluoberyllate, lixiviated with water out of the calcined mass, the beryllium can be obtained in the form of carbonate and/or hydroxide by treatment with alkali carbonate or hydrate, according to one of the following reactions:

$$3Na_2BeF_4 + 3Na_2CO_3 = 3BeCO_3 + 12NaF \quad (IV)$$

or also:

$$3Na_2BeF_4 + 6NaOH = 3Be(OH)_2 + 12NaF \quad (V)$$

The beryllium hydroxide or carbonate is separated by filtration from the sodium fluoride solution. This latter however is not evaporated in order to obtain the solid fluoride, but is directly utilised for regenerating the sodium fluosilicate by adding thereto finely subdivided silica (which may be obtained by treating with an acid an alkali silicate) together with a sufficient amount of acid, so as to promote the following reaction:

$$12NaF + 8HCl + 2SiO_2 =$$
$$2Na_2SiF_6 + 8NaCl + 4H_2O \quad (VI)$$

The sodium fluosilicate, that is almost insoluble in water, becomes practically insoluble in the NaCl solution (about 5%) formed and precipitates out of this solution. It is then easily separated by decanting and can be employed again in the process cycle after a simple draining.

The complete cycle may be summarized as follows:

(1) Powdering of beryl
(2) Mixing of powdered beryl with sodium fluosilicate and sodium carbonate or hydroxide;
(3) Granulation or formation of the mixture into blocks;
(4) Sintering
(5) Powdering of the sintered mixture;
(6) Lixiviation of the sodium fluoberyllate with water and decantation;
(7) Filtering of the sodium fluoberyllate solution;
(8) Precipitation of the beryllium hydroxide or carbonate;
(9) Separation by filtration of the precipitated beryllium hydroxide or carbonate from the sodium fluoride solution; and
(10) Treating the sodium fluoride solution with silica and an acid and separation from exhausted mother liquors of the regenerated sodium fluosilicate to be employed again in step 2 of the cycle.

*Example*

100 kgs. of beryl containing 11% of BeO are finely ground and intimately mixed with 17 kgs. of commercial soda (or also with 28 kgs. of a 50% solution of caustic soda) and with 61 kgs. of commercial sodium fluosilicate (title about 92%), mixed with water and granulated or also formed into blocks. The mixture is introduced into a rotating kiln or into a muffle furnace and is subjected to calcination during two hours or so at temperatures of 660 to 690° C. After the reaction is completed, the sintered mass is discharged and allowed to cool in a drying apparatus where its heat may be utilised for pre-heating the mixture for a further batch.

After cooling, the sintered mass is pulverised until its fineness is such as to pass through a sieve having 144 meshes per square centimeter and the powder is introduced into a lixiviator provided with a stirring device where it is lixiviated with hot water. After about 20 minutes all sodium fluoberyllate formed during the sintering is dissolved and can be separated from the insoluble residue by decantation. The decanted liquid is then filtered through a vacuum filter and the residue on the filter is thoroughly washed. Thus the beryllium compound is separated by a single operation from the remaining constituents of the earth and a sodium fluoberyllate solution is obtained which is practically free from silica, alumina and iron.

The fluoberyllate solution thus obtained is treated at boiling temperature with 300 kgs. of a 15% solution of NaOH and thus the beryllium hydroxide is precipitated, which is separated from the fluoride solution by filtration. After a thorough washing of the precipitate and calcination, about kgs. 10.5 of beryllia (BeO) are obtained, which means that the extraction output is of about 95%.

The mother liquor, constituted by a sodium fluoride solution is introduced into a vessel fitted with a stirring device and 400 kgs. of a 15% solution of HCl and 20 kgs. of finely subdivided silica are added. The mass is stirred for an hour or so, then is allowed to cool and the precipitate formed, that is mainly composed of sodium fluosilicate is separated from the exhausted mother liquor by decantation. This latter can be discharged away as it is composed substantially of a practically valueless 5% NaCl solution, or also it may be utilised, according to the circumstances. The precipitated sodium fluosilicate is discharged, drained and may be employed, also in a wet condition, for mixing with a fresh beryllium earth.

The above described steps are given only by way of example and may be performed in a continuous cycle, viz. the sintering may be effected in suitable kilns, as the rotating kilns, the lixiviation and decanting, in suitable continuous lixiviators and decanting apparatus (as those of the Dorr type) and the filtration by means of continuous rotating or vacuum filters (such as those of the Oliver type). By suitably choosing the said apparatus all losses may be reduced to a minimum.

From the foregoing it is apparent that the advantages inherent to the process according to the invention as compared to the previous processes are very important both from technical and economical viewpoint.

It is also apparent that the process according to the invention may undergo various changes, according to the circumstances. Thus the optimum temperature for the decomposition may vary according to the nature of the earths or rocks to be treated and may lie between 600 and 750° C., whereof the upper temperatures are most suitable for minerals having a low beryllia content. Furthermore, alkali salts other than the sodium ones may be employed for the treatments, and especially potassium salts; the silica for regenerating the alkali fluosilicate may be added in the form of gelatinous silica or also in the form of soda glass, and still other variations are apparent to those skilled in the art.

I claim:

1. A process for the preparation of beryllium compounds from beryllium earth which comprises mixing the finely powdered earth with an alkali metal fluosilicate, and with a caustic compound from the class consisting of alkali metal oxides, hydroxides and carbonates, and calcining the mixture at sintering temperature, said caustic compound, said fluosilicate and said earth being present in relative amounts substantially as indicated by the equation $$M_2O + 2M_2SiF_6 + 3BeO.Al_2O_3.6SiO_2 = 3M_2BeF_4 + 8SiO_2 + Al_2O_3$$

wherein "M" designates alkali metal.

2. A process as defined in claim 1 which comprises further, lixiviating the calcined mixture in water, separating the solution of alkali fluoberyllate from the insoluble residue, treating the said solution substantially at boiling temperature with water soluble alkali metal compounds of the class consisting of sodium carbonate and sodium hydroxide to obtain a beryllia precipitate and a sodium fluoride solution, separating the precipitate from the solution, treating the solution with finely divided silicon dioxide and a mineral acid, recovering insoluble fluosilicate from the reaction mixture by decantation.

3. A process for the preparation of beryllia from beryl which comprises finely powdering the beryl, mixing the same with a caustic compound of the class consisting of sodium carbonate, sodium hydroxide and sodium oxide and with sodium fluosilicate in such proportions that the mixture contains the following constituents in substantially the proportions indicated:

| | Kilograms |
|---|---|
| Beryl | 11 |
| Sodium oxide | 9.32 |
| Sodium fluosilicate (92%) | 61 | calcining the mixture at a temperature of about 660 to about 690°, lixiviating sodium fluoberyllate from the insoluble residue, precipitating beryllia by treatment of the hot fluoberyllate solution with alkali, separating beryllia from the alkali fluoride solution, and recovering the alkali fluoride from the solution.

4. A process according to claim 3 in which the alkali fluoride is recovered from its solution by treating said solution with finely subdivided silica in the presence of a mineral acid to form practically insoluble alkali fluosilicate.

5. A process for the treatment of beryllium earth which comprises powdering the earth, mixing the powdered earth with sodium fluosilicate and with a caustic compound from the class consisting of sodium carbonate, sodium hydroxide and sodium oxide, grinding the mixture, calcining the mixture at sintering temperature, powdering the sintered product, separating sodium fluoberyllate from the insoluble residue by lixivation, filtering the fluoberyllate solution, precipitating beryllia from the fluoberyllate solution by alkali treatment and separating the precipitated beryllia by filtration; said caustic compound, said sodium fluosilicate and said earth being present in the mixture in relative amounts substantially as indicated by the equation $$Na_2O + 2Na_2SiF_6 + 3BeO.Al_2O_3.6SiO_2 = 3Na_2BeF_4 + 8SiO_2 + Al_2O_3$$

6. A process according to claim 5 in which the beryllia is precipitated by treatment with a caustic sodium compound and the resultant solution after separation of beryllia is treated with silica and a strong mineral acid to precipitate therefrom sodium fluosilicate.

7. A process according to claim 5 in which the fluosilicate employed for decomposing the earth is derived, at least in part, by treating a sodium fluoride solution with finely subdivided silica and a strong mineral acid.

8. A process for the preparation of beryllium compounds from beryllium earth which comprises mixing the finely powdered earth with an alkali metal fluosilicate, and with a caustic compound from the class consisting of alkali metal oxides, hydroxides and carbonates, and calcining the mixture at sintering temperature, the said caustic compound, said fluosilicate and said earth being present in relative amounts substantially as indicated by the equation $$Na_2O + 2Na_2SiF_6 + 3BeO.Al_2O_3.6SiO_2 = 3Na_2BeF_4 + 8SiO_2 + Al_2O_3$$

9. A process for the preparation of beryllium compounds from beryllium earth which comprises mixing the finely powdered earth with sodium fluosilicate, and with sodium hydroxide in substantially the relative amounts indicated by the equation $$2NaOH + 2Na_2SiF_6 + 3BeO.Al_2O_3.6SiO_2 = 3Na_2BeF_4 + 8SiO_2 + Al_2O_3 + H_2O$$

and calcining the mixture at sintering temperature.

10. A process for the preparation of beryllium compounds from beryl which comprises mixing the finely powdered beryl with sodium fluosilicate, and with sodium hydroxide, and calcining the mixture at sintering temperature, the ratio of sodium hydroxide to beryl by weight being not substantially less than 0.15 to 1.

11. A process for the preparation of beryllium compounds from beryllium earth which comprises mixing the finely powdered earth with sodium fluosilicate, and with sodium carbonate in substantially the relative amounts indicated by the equation $$Na_2CO_3 + 2Na_2SiF_6 + 3BeO.Al_2O_3.6SiO_2 = 3Na_2BeF_4 + 8SiO_2 + Al_2O_3 + CO_2$$

and calcining the mixture at sintering temperature.

12. A process for the preparation of beryllium compounds from beryl which comprises mixing the finely powdered beryl with sodium fluosilicate, and with sodium carbonate and calcining the mixture at sintering temperature, the ratio of sodium carbonate to beryl by weight being not substantially less than 0.2 to 1.

REMO SZYIA OPATOWSKI.